W. L. MIGGETT.
AUTOMOBILE.
APPLICATION FILED DEC. 31, 1909.
1,005,863.
Patented Oct. 17, 1911.
2 SHEETS—SHEET 1.
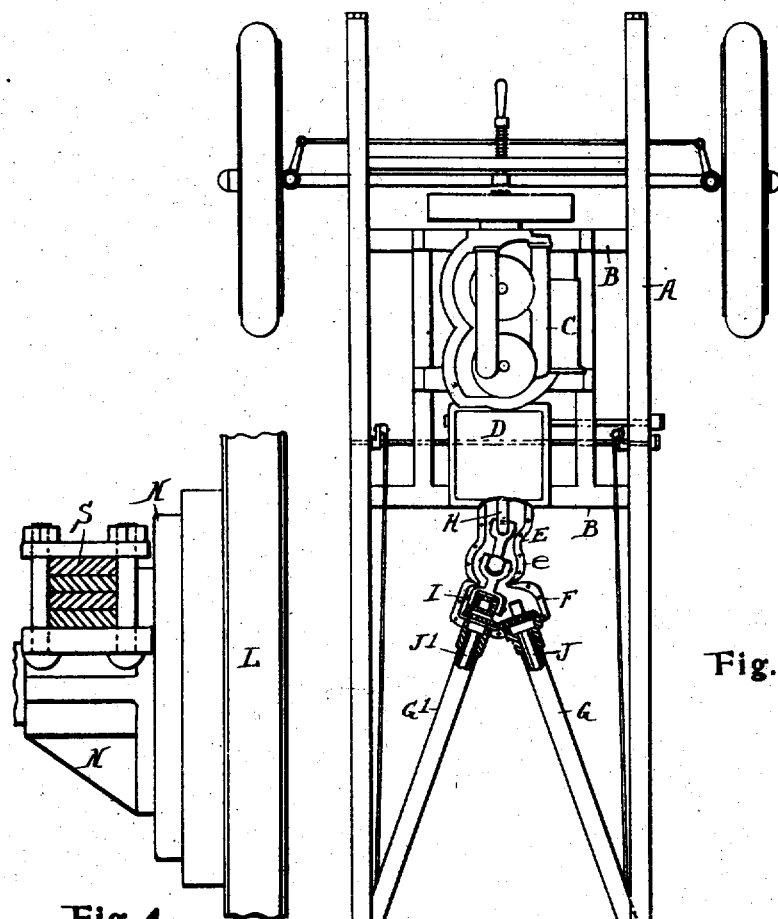
Fig. 1.
Fig. 4.
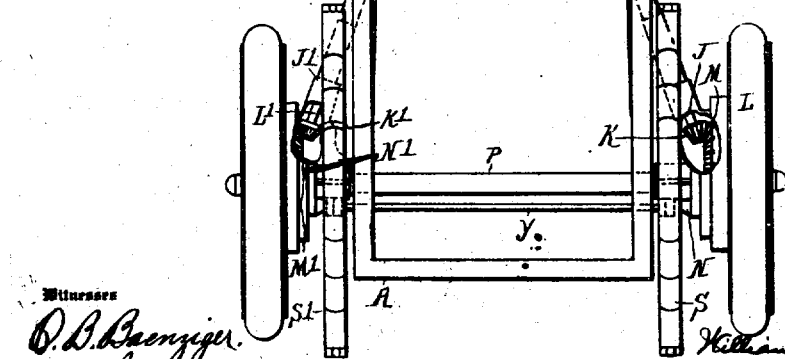

W. L. MIGGETT.
AUTOMOBILE.
APPLICATION FILED DEC. 31, 1909.
1,005,863.
Patented Oct. 17, 1911.
2 SHEETS—SHEET 2.
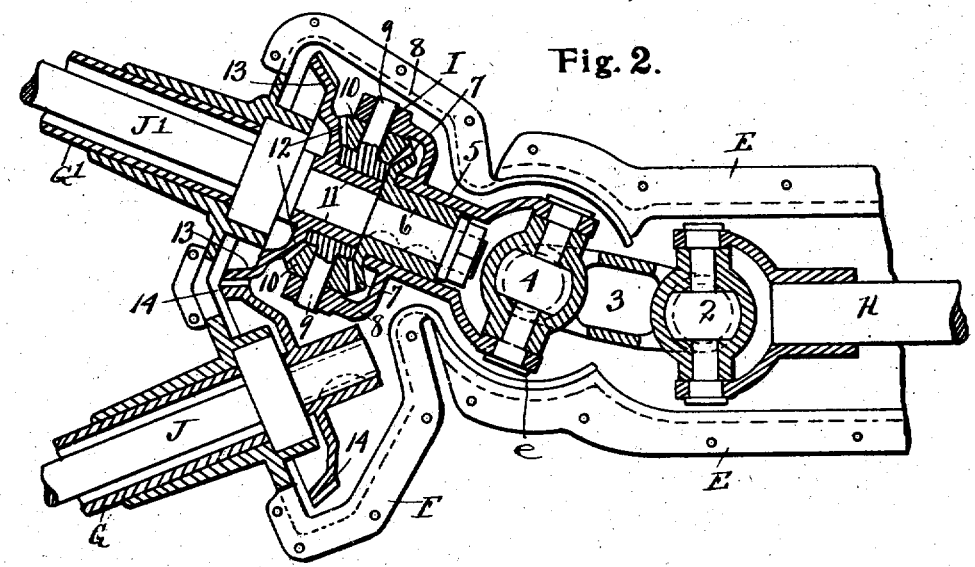
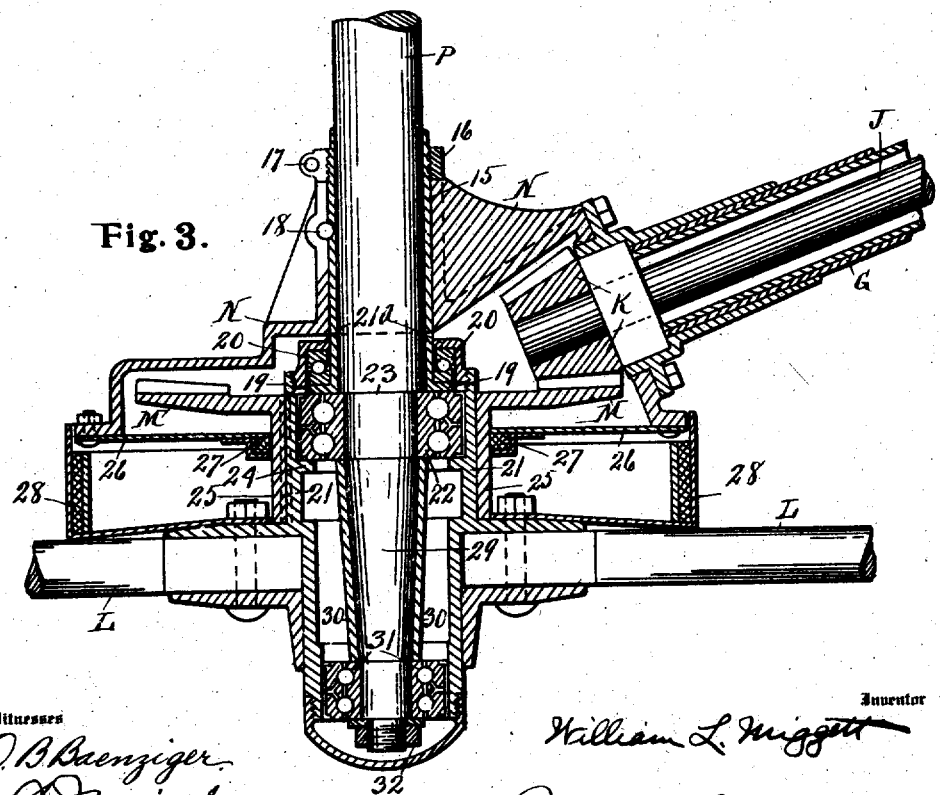

UNITED STATES PATENT OFFICE.

WILLIAM L. MIGGETT, OF ANN ARBOR, MICHIGAN.

AUTOMOBILE.

1,005,863.  Specification of Letters Patent.  Patented Oct. 17, 1911.

Application filed December 31, 1909.  Serial No. 535,730.

*To all whom it may concern:*

Be it known that I, WILLIAM L. MIGGETT, a citizen of the United States, residing at Ann Arbor, county of Washtenaw, State of Michigan, have invented a certain new and useful Improvement in Automobiles, and declare the following to be a full, clear, and exact description of the same, such as will enable others skilled in the art to which it pertains to make and use the same, reference being had to the accompanying drawings, which form a part of this specification.

My invention relates to automobiles and an object of my improvements is to provide an automobile having an improved form of running-gear and one having a solid driving axle. I secure this object in the device illustrated in the accompanying drawings, in which,—

Figure 1, is a plan view of the chassis and running-gear of an automobile embodying my invention. Fig. 2, is a plan view mostly in section, showing the details of the apparatus where the power of the engine is communicated to the transmission shafts. Fig. 3, is a plan view, mostly in section, showing the details of the construction adjacent to the point at which the power is communicated to the driving wheel. Fig. 4, is a detail elevation illustrating the relative arrangement of the rear springs and adjacent parts.

A, A is the chassis; B, B are crosspieces which carry the engine C; P is the rear axle. This is solid, or continuous from end to end so that it does not require a casing or bracing to give it strength.

D is the change speed gear casing; E is an extension from the gear casing D; F is a casing jointed to the extension E, in this instance by a ball-and-socket joint $e$, as illustrated most distinctly in Fig. 2.

G, $G^1$ are tubular casings or cylindrical tubes extending from the casing F to the gear casings N, $N^1$ secured upon the rear axle P adjacent to the ends of said axle and the driving wheels L, $L^1$. The tubes G, $G^1$ branch from a common point where they are united to the casing F and extend to the gear casings N, $N^1$. The casing F is firmly jointed to the extension E from the casing D and casings N, $N^1$ are firmly but pivotally secured upon the driving axle P so that the tubes G, $G^1$, and connections form braces for the rear axle P, both against lateral forces, and to sustain the driving and brake torques.

H is the power shaft of the engine C; J, $J^1$ are transmission shafts each having one end pivoted in the casing F and the other pivoted in a gear casing N or $N^1$. The shafts J, $J^1$ extend through and are inclosed by the tubes G, $G^1$. The power from the shaft H is transmitted simultaneously to transmission shafts J, $J^1$ through a balanced gear, as hereinafter described.

M, $M^1$ are bevel-gear-wheels secured upon the hubs respectively of the driving-wheels L and $L^1$.

K and $K^1$ are bevel-gear-wheels meshing with the bevel-gear-wheels M and $M^1$ and secured to the rear ends of the shafts J and $J^1$, as hereinafter described in connection with Fig. 3. The rear springs S, $S^1$ which carry the body are secured respectively to the gear casings N and $N^1$, as illustrated in Fig. 4 and said casings are sleeved upon the axle P so that said axle may turn in said casing.

The apparatus for transmitting the power of the engine to the shafts J, $J^1$ is more particularly described as follows, referring to Fig. 2. 2 is a universal joint secured to the end of the shaft H; 3 is a link pivoted at one end in the universal joint 2 and at the other end in a universal joint 4; 5 is a sleeve pivoted to the link 3 by the universal joint 4; 6 is a sleeve fitting and adapted to turn in the sleeve 5 and is keyed upon the end of the shaft $J^1$; 7 is a bevel-gear-wheel on the sleeve 6; 8 indicates a cage, or forks, extending from the sleeve 5 and carrying the radial extending pins 9, 9. 10, 10 are bevel-gear-wheels pivoted upon the pins 9, 9 and having their teeth engaging the teeth of the bevel-gear-wheel 7. 11 is a sleeve fitting and adapted to turn upon the shaft $J^1$ adjacent to the sleeve 6; 12 is a bevel-gear-wheel upon the sleeve 11 having its teeth engaging with the teeth of the bevel-gear-wheels 10, 10; 13 is a second bevel-gear-wheel rigidly secured to the sleeve 11. The second transmission shaft J is provided with the bevel-gear-wheel 14 which engages the bevel-gear-wheel 13. By this mechanism the power from the shaft H is imparted equally to the gear-wheels 7 and 12 through the gear-wheels 10, 10 and the transmission shaft $J^1$ is actuated by the gear-wheel 7 which is keyed upon said shaft, and the transmission shaft J is actuated through the gear-wheels 13 and 14 by the power transmitted to the bevel-gear-wheel 12 by the bevel-gear-wheels 10, 10.

The construction adjacent to the driving wheels is the same upon each side of the chassis and is described as follows, referring more particularly to Fig. 3. The shaft J is pivoted in bearings in the casing N and is keyed at its end to the bevel-gear-wheel K which gear-wheel engages the bevel-gear-wheel M, which latter is secured upon the hub 21 of the wheel L, through a sleeve 25 so that power is conveyed from the shaft J to the wheel L through said gear-wheels. 15 is a sleeve upon the rear axle P adapted to turn and to have a slight longitudinal motion relative to said axle. The gear casing N is secured upon the sleeve 15 by a clamping bolt, the place for which is indicated at 18, and by a nut 16 screwed upon the end of said sleeve and clamped in position by a clamping bolt at 17. The outer end of the sleeve 15 is turned into a plane perpendicular to the axis of said sleeve, as indicated at 19. 20 is a thrust-bearing resting against the flange 19. The hub 21 of the wheel L extends over the flange 19 and is provided with a cap 21ª which screws on to the end of said hub and has an inwardly extending flange surrounding the sleeve 15 and bearing against the thrust-bearing 20. 23 is a shoulder formed upon the axle P. 24 is an annular flange extending inward from the hub 21. 22 is a ball-bearing abutting against the shoulder 23, flange 19 and flange 24. 30 is a thimble upon the end of the axle P, its inner end abutting against the bearing 22. 31 is a ball-bearing on the outer end of the axle P abutting against the outer end of the thimble 30 and secured in position by a nut 32. 28 is a casing for the brake mechanism. This is bolted to the wheel L as shown and is inclosed by its cylindrical periphery and its outer end by the plate extending inward from its periphery and secured to the wheel hub, and is closed at its inner end by a disk 26 bolted to the casing N surrounding the sleeve 25 and provided with the felt washer 27 to close the joint between said disk and sleeve and prevent dust and dirt from entering the casing N.

It will be observed that by the above described mechanism a simple and strong construction is secured which is entirely inclosed, in which the power of the engine may be conveyed directly and with equal force to the two driving-wheels, in which the rear axle is solid, and does not require a built-up casing to support it. In case a part of one of the ball-bearings 22 should be broken, or get out of order, this will not occasion the entire stoppage of the operation of the mechanism because the axle P may turn in the bearings afforded by the sleeves 15. There will be a slight movement of the driving-wheels L, L¹ relative to the axle in a lateral direction or in the direction of the length of the axle P. In order that this shall not disarrange the accurate adjustment of the gears K and M it is provided that the casing N carrying the gear K shall follow the lateral movement of the wheel L carrying the gear M, and the relative position of said gears shall not be altered. The relative positions of the gears K and M may be adjusted by the nut 16. The two casings N, N¹ may be united by a tie-rod as shown at Y, Fig. 1.

Claims:—

1. In an automobile, the combination of two driving wheels, a shaft adapted to drive each of said wheels, said shafts converging toward a point at a distance horizontally from the axis of said wheels, and a balance gear located adjacent to the point of convergence of said shafts adapted to rotate said shafts and to permit independent motion of said shafts.

2. In an automobile, the combination of two driving wheels, a shaft adapted to drive each of said wheels, said shafts converging toward a point at a distance horizontally from the axis of said wheels, and a balance gear located adjacent to the point of convergence of said shafts adapted to rotate said shafts and to permit independent motion of said shafts, an automobile frame, a casing secured to each of said wheels inclosing one of said shafts, said casings being joined together at their adjacent ends and at this point joined to the frame by a universal joint.

3. In an automobile, the combination of two driving wheels, a shaft adapted to drive each of said wheels, said shafts converging toward a point at a distance horizontally from the axis of said wheels, and a balance gear located adjacent to the point of convergence of said shafts adapted to rotate said shafts and to permit independent motion of said shafts, a power plant and a universal flexible connection between said balance gear and said power plant.

4. In an automobile, the combination of two driving wheels, a frame yieldingly supported on said driving wheels, a shaft geared to each of said driving wheels, said shafts converging toward a point at a distance horizontally from the axis of said wheels, and a balance gear supported by said frame so as to have a universal angular motion located adjacent to the point of convergence of said shafts adapted to rotate said shafts and to permit independent motion of said shafts.

5. In an automobile, the combination of two driving wheels, a frame yieldingly supported on said driving wheels, a shaft geared to each of said driving wheels, said shafts converging toward a point at a distance horizontally from the axis of said wheels, and a balance gear secured to said frame located adjacent to the point of convergence of said shafts adapted to rotate said shafts and to permit independent motion of said shafts, said gearing and shafts being inclosed in casings secured to said driving wheels adjacent thereto, converging toward each other and united together at their adjacent ends and united to the frame by a universal joint at their adjacent ends.

6. The combination of a power shaft, two shafts, one end of each of said two shafts being geared to a driving wheel, the other end of each of said two shafts being connected to said power shaft through a balance gear and a universally flexible connection.

7. The combination of a power shaft, two shafts, one end of each of said two shafts being geared to a driving wheel, the other end of each of said two shafts being connected to said power shaft through a mechanism consisting solely of a balance gear, a pair of gears and a universally flexible connection.

In testimony whereof, I sign this specification in the presence of two witnesses.

WILLIAM L. MIGGETT.

Witnesses:
CHARLES C. JENNINGS,
ELLIOT J. STODDARD.

DISCLAIMER.

1,005,863.— *William L. Miggett*, Ann Arbor, Mich. AUTOMOBILE. Patent dated October 17, 1911. Disclaimer filed December 11, 1915, by the inventor.

Enters the following disclaimer:

"I am aware that converging driving shafts have been used in combination with a divided counter shaft driven by a balance gear of the usual construction in the usual way, said counter shaft being geared to said converging shafts, and therefore do not claim such combination, it being apparent that my invention consists broadly in a combination in which no counter shaft, bearings therefor, and gears in addition to the converging shafts and their bearings is employed."

[*Official Gazette, December 21, 1915.*]

ported on said driving wheels, a shaft geared to each of said driving wheels, said shafts converging toward a point at a distance horizontally from the axis of said wheels, and a balance gear secured to said frame located adjacent to the point of convergence of said shafts adapted to rotate said shafts and to permit independent motion of said shafts, said gearing and shafts being inclosed in casings secured to said driving wheels adjacent thereto, converging toward each other and united together at their adjacent ends and united to the frame by a universal joint at their adjacent ends.

6. The combination of a power shaft, two shafts, one end of each of said two shafts being geared to a driving wheel, the other end of each of said two shafts being connected to said power shaft through a balance gear and a universally flexible connection.

7. The combination of a power shaft, two shafts, one end of each of said two shafts being geared to a driving wheel, the other end of each of said two shafts being connected to said power shaft through a mechanism consisting solely of a balance gear, a pair of gears and a universally flexible connection.

In testimony whereof, I sign this specification in the presence of two witnesses.

WILLIAM L. MIGGETT.

Witnesses:
CHARLES C. JENNINGS,
ELLIOT J. STODDARD.

DISCLAIMER.

1,005,863.—*William L. Miggett*, Ann Arbor, Mich. AUTOMOBILE. Patent dated October 17, 1911. Disclaimer filed December 11, 1915, by the inventor.

Enters the following disclaimer:

"I am aware that converging driving shafts have been used in combination with a divided counter shaft driven by a balance gear of the usual construction in the usual way, said counter shaft being geared to said converging shafts, and therefore do not claim such combination, it being apparent that my invention consists broadly in a combination in which no counter shaft, bearings therefor, and gears in addition to the converging shafts and their bearings is employed."

[*Official Gazette, December 21, 1915.*]

DISCLAIMER.

1,005,863.—*William L. Miggett*, Ann Arbor, Mich. AUTOMOBILE. Patent dated October 17, 1911. Disclaimer filed December 11, 1915, by the inventor. Enters the following disclaimer:

"I am aware that converging driving shafts have been used in combination with a divided counter shaft driven by a balance gear of the usual construction in the usual way, said counter shaft being geared to said converging shafts, and therefore do not claim such combination, it being apparent that my invention consists broadly in a combination in which no counter shaft, bearings therefor, and gears in addition to the converging shafts and their bearings is employed."

[*Official Gazette, December 21, 1915.*]